A. F. JOHNSON.
AUTO POWER TRANSMITTING JACK.
APPLICATION FILED MAR. 29, 1915.
1,153,791.
Patented Sept. 14, 1915.
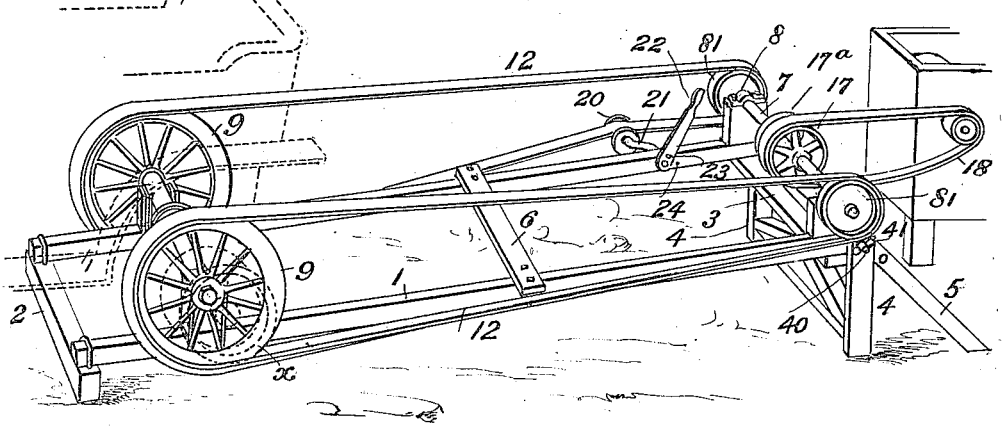
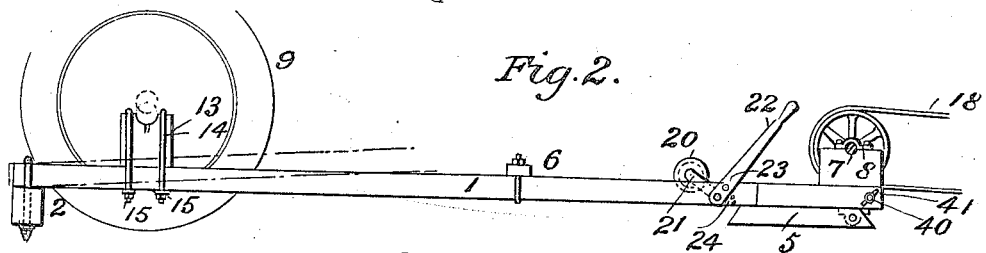
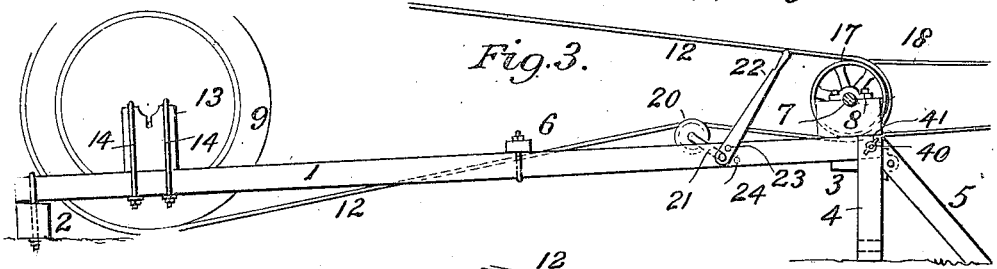
WITNESSES:
John T. Schrott
INVENTOR
A. F. Johnson
BY
Fred G. Dieterich
ATTORNEYS,

UNITED STATES PATENT OFFICE.

ADOLF F. JOHNSON, OF EL CAMPO, TEXAS.

AUTO POWER-TRANSMITTING JACK.

1,153,791.  Specification of Letters Patent.  Patented Sept. 14, 1915.

Application filed March 29, 1915. Serial No. 17,834.

*To all whom it may concern:*

Be it known that I, ADOLF F. JOHNSON, residing at El Campo, in the county of Wharton and State of Texas, have invented a new and Improved Auto Power-Transmitting Jack, of which the following is a specification.

My invention has for its purpose to provide a simple and inexpensive appliance in the nature of a jack adapted for being used in connection with auto vehicles and which is especially designed for transmitting power from the drive axle of the vehicle to another shaft to provide for operating light machinery for various uses.

In its generic nature, my invention embodies a framing adapted for being readily placed under the engine driven axle shaft of the vehicle to jack it up so as to leave the driven wheels freely rotatable; means being mounted upon the said frame, including a power transmitting shaft for connecting with one or both of the said freely rotatable wheels whereby to utilize the vehicle engine power for various uses.

In its more specific nature, my invention consists in certain details of construction and peculiar combination of parts all of which will be hereinafter fully explained, specifically pointed out in the appended claims and illustrated in the accompanying drawing, in which:

Figure 1 is a perspective view of my invention, the same being shown as operatively applied for use. Fig. 2 is a side elevation of the jack in such position when the rear auto wheels are run upon it prior to being jacked up, the pivoted legs being folded. Fig. 3 is a similar view showing the legs extended and the auto wheels jacked up and in position for transmitting power. Fig. 4 is a detail perspective view of a portion of the rear end of the jack showing more particularly the legs and braces.

In the practical arrangement, my power transmission comprises a main or body portion in the nature of a rectangular frame formed of the longitudinal side bars 1—1 connected at one end by a cross bar 2 hereinafter termed an anchor bar and at the other end by a cross bar 3, the said bars 2 and 3 being bolted on the under edges of the side bars or beams 1. The outer or front ends of the beams 1—1 are pivoted to the upper ends of leg members 4—4 whose purpose is to support the said side beams on an angle inclined downwardly from the said outer end to the inner or anchor end, it being understood that when not in use the legs may be folded flatwise over the outer ends of the beams 1, as indicated in Fig. 2, and to hold the legs locked to the extended or upright position their upper or pivotal ends have bolts 40 on which thumb nuts 41 are screwed so that the legs may be locked to the proper position.

5—5 designate braces hinged to the legs 4 that serve as the anchoring means for the outer end of the jack to hold the said jack from slipping longitudinally when the same is operatively connected to the motor vehicle, as indicated in Fig. 1.

6 designates a central cross brace bolted at its ends to the side beams, as shown.

A shaft 7 is transversely mounted on the outer end of the frame and the same is journaled in boxes 8—8 mounted on the side beams 1—1 and the said shaft carries a pulley 81 at one end to which the power is transmitted from one of the motor driven wheels 9 by means of a belt 12.

13 designates bearing blocks of which there is one on each side beam and the said blocks are longitudinally adjustable on the beams 1—1 to which they are clamped by the clip bolts and nuts 14—15. By reason of adjustably mounting the bearing blocks 13, as stated, I am enabled to use a frame of a standard size for use in connection with all types of auto vehicles, since the bearing blocks 13 can be shifted up or driven from the side beams 1—1 to suit the different sized driving wheels of the different or standard types of auto vehicles, suitable adjusting nuts and bolts 15—14 being provided for the purpose.

17—17ª designate fast and loose pulleys on the driven shaft over which takes a belt 18 that transmits the power to be utilized for operating small machinery, see Fig. 1.

A belt tightener is mounted on one of the side beams 1 that engages with the transmission belt 12 and which comprises a flanged pulley 20 mounted on a crank shaft 21 rockably held on one of the side beams 1 and with which connects a hand lever 22 having a lock pin 23 for engaging any one of a segmental series of apertures 24 on the adjacent face of the side beam 1.

From the foregoing taken in connection with the drawing, the complete construction, the manner of use and the advantages of my invention will be readily apparent. To apply the same for use, the framing is placed flatwise under the rear end of the auto vehicle, the blocks 13 having been previously adjusted to suit the height of the driving axle housing. The leg members at the outer ends of the frame beams 1—1 are then swung out to elevate the front end of the frame and to thereby jack up the rear axle and the driven wheels. The leg members are then locked to their extended position, after which the brace members are swung down to anchor the outer end of the frame, it being shown that the inner or anchoring end is held from slipping by the weight of the machine forcing the said anchoring end down against the ground or floor. The belt connection is then made between each of the auto driven wheels and the pulley on the shaft to be driven, the slack of the belt being taken up by proper adjustment of the tightener device.

In order to get the required speed ratio, a fly or balance wheel may be attached in any suitable manner to one or both of the auto drive wheels 9, as shown in dotted lines on Fig. 1, see X.

What I claim is:

1. The combination with an auto vehicle; of a power jack appliance that comprises side beams, a cross bar connecting one end of each side beam to the other and resting on the ground, said side beams inclining upwardly, legs secured to the other ends of said side beams, anchoring members connected to said legs, journal boxes slidably adjustably mounted on said side beams for adjustment to any position along said side beams, said journal boxes having provision to receive the axle of an auto vehicle, substantially as shown and described.

2. A power jack appliance for automobiles that comprises a body composed of side beams, a cross member that joins one end of the said beams, leg members pivotally connected to the other end of the said beams, means for holding the legs to their extended position, a transverse shaft transversely mounted on that end of the frame having the legs, a pulley on the shaft for receiving a driving belt from one of the driven wheels of the automobile, another pulley on the shaft for receiving a power take-off belt, bearing boxes adjustably mounted on the side beams, and means on the leg end of the frame for anchoring the said end against endwise shifting when the jack appliance is applied for use.

3. A power jack for automobiles comprising a frame composed of a pair of side beams, a cross bar connecting one end of the said side beams, a journal bearing block slidably adjustable on each of the said side beams, a leg member pivotally mounted on the other end of each of the said side beams, means for holding the said legs locked to their extended position, a brace member hingedly connected to each leg member, a shaft transversely journaled on the leg end of the side beams, a pulley on one of the said shafts, an endless belt that takes around the said pulley and is adapted for taking around one of the driven wheels of the automobile and an adjustable belt tightener mounted on one of the said side beams for engaging the said belt.

ADOLF F. JOHNSON.

Witnesses:
C. L. BROWN,
J. H. BOYD.